Feb. 23, 1954 L. H. ENOS 2,670,050
MULTIBLADE PROPELLER AND COWLING THEREFOR
Filed March 30, 1949
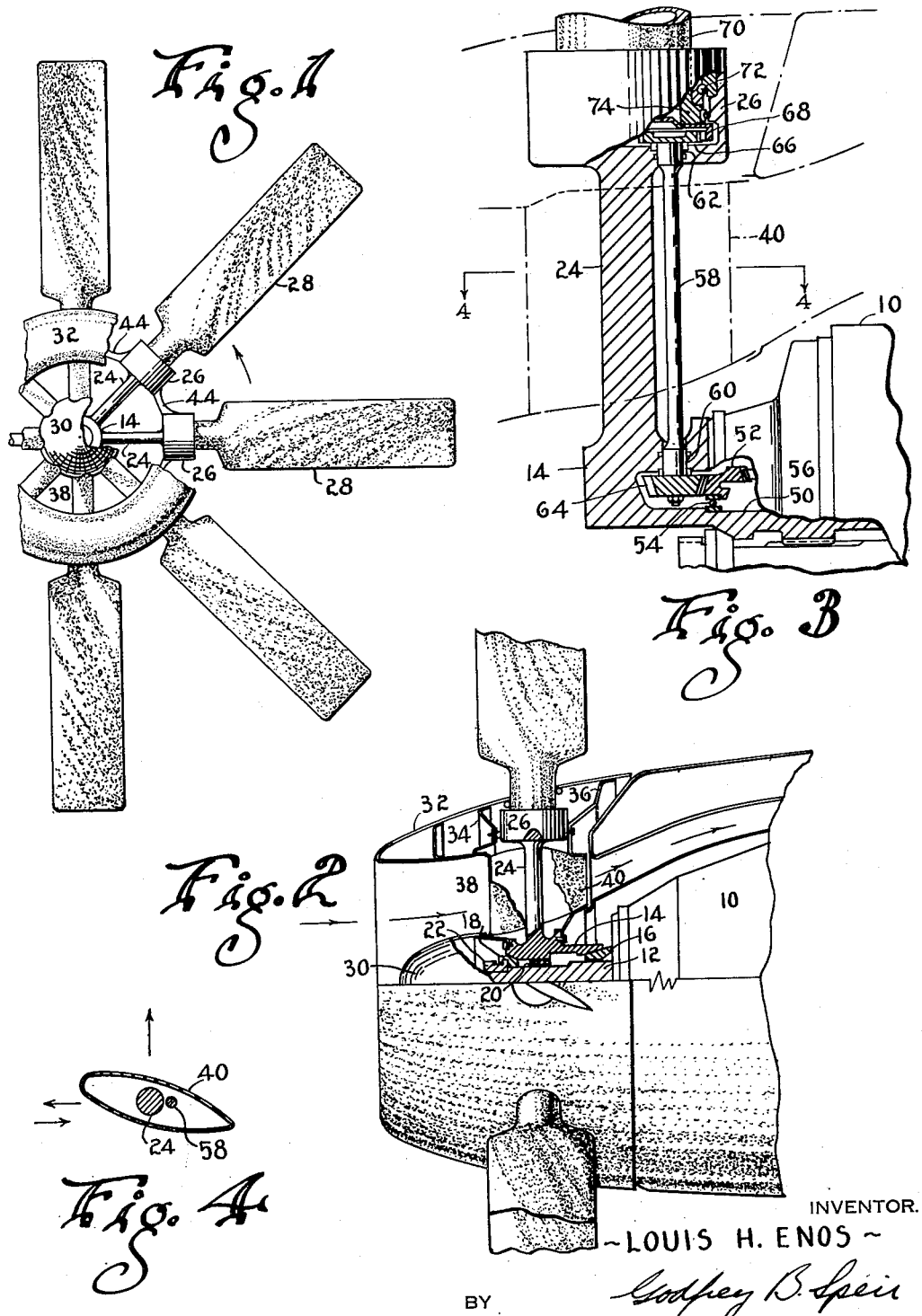
INVENTOR.
~ LOUIS H. ENOS ~
BY
ATTORNEY.

Patented Feb. 23, 1954

2,670,050

UNITED STATES PATENT OFFICE 2,670,050

MULTIBLADE PROPELLER AND COWLING THEREFOR

Louis H. Enos, Montclair, N. J., assignor to Curtiss-Wright Corporation, a corporation of Delaware Application March 30, 1949, Serial No. 84,454

6 Claims. (Cl. 170—135.743)

This invention relates to aeronautical propeller installations and includes improvements in propellers and cowling systems therefor adapted for use with high speed aircraft.

An object of the invention is to provide a propeller having a large number of blades—of the order of six to ten—and to provide a hub arrangement to accommodate this large number of blades which are mounted for pitch adjustment. Another object of the invention is to provide a propeller hub arrangement adapted for use with a hollow spinner and cowling system, the hub being so arranged as to present minimum obstruction to the flow of air through the hollow spinner and cowling.

Another object of the invention is to provide a propeller hub system wherein blades are retained in sockets which are relatively remote, in a radial direction, from the axis of propeller rotation, and wherein remote driving means are incorporated in the propeller hub to enable pitch changing of the several propeller blades from a centrally located pitch changing mechanism. A further object of the invention is to provide a structural support for a propeller blade which is located remotely from the axis of rotation, and to provide a propeller pitch changing element in close proximity to the structural support in order that these two elements may be faired or streamlined in a manner to present minimum drag to airflow passing thereover. Still another object of the invention is to provide an axial flow spinner and cowling system, in conjunction with a propeller, wherein the spinner is carried by a rotating part of the propeller system.

In brief, the invention includes a small propeller hub having slender integral rigid spokes radiating therefrom, the spokes at their outer ends carrying sockets within which propeller blades are rotatably mounted for pitch change. The hub sockets, spaced circumferentially from one another, are joined by structural ties. The radially outward spacing of the hub sockets enables the use of a large multiplicity of blades which would not be possible, due to interference of the sockets with one another, if the sockets were disposed close to the axis of rotation. The spokes preferably may be solid structural members of minimum diameter, thereby offering minimum drag to air which may flow through the propeller hub inwardly of the blade sockets. A pitch change mechanism is incorporated in the central portion of the propeller hub and drive shafts lead therefrom to each blade in each socket, preferably, parallel to the hub spokes, to impart pitch changing rotation from the central hub to the remotely mounted blades. This propeller hub is particularly adapted for use with a so-called NACA type E cowling wherein a spinner, with an axial air entrance opening, is mounted upon the propeller and cooperates with a fixed cowling. Airflow through the spinner passes to a turbine engine or the like, across the spokes of the propeller hub, while the multiplicity of blades, exteriorly of the spinner, operate upon the air for propulsion of the aircraft. The multiple blade propeller made possible by this invention is particularly adapted for transonic flight speeds, but is not limited to such speeds.

For a more detailed understanding of the invention, reference may be made to the attached drawings and to the following detailed description, the specific disclosure covered thereby being exemplary of one embodiment of the invention but being nonlimiting as the scope of the invention, such scope being defined only in the attached claims.

Similar reference characters indicate similar parts in the drawings, wherein Fig. 1 is a fragmentary frontal view of a propeller according to the invention, partly broken away;

Fig. 2 is a side elevation of a propeller and cowling according to the invention, partly broken away and partly in section;

Fig. 3 is an enlarged longitudinal section of a portion of an alternative arrangement of the propeller; and Fig. 4 is a section on the line 4—4 of Fig. 3.

In Figs. 1 and 2, a power plant nose is indicated at 10 from which protrudes a propeller shaft 12, the latter having mounted thereon, in conventional fashion, a propeller hub 14, through tapered bushings 16 and 18, splines 20, and a securing nut 22. The propeller hub 14 is of relatively small diameter and is provided with a plurality of slender integral spokes 24 extending radially outward from the hub 14 and integrally carrying, at their outer ends, cup-like blade sockets 26 open at their outer ends to receive the shanks of blades 28. By the outward extension provided by the spokes 24, a large number of blade sockets 26 may be provided, the number of sockets indicated in the drawings being eight. A larger or smaller number of blade sockets may be provided if desired. Secured within each socket 26 is the shank of a propeller blade 28, the securement, in the arrangement of Figs. 1 and 2, being such that the propeller blades may be adjusted in pitch on the ground with the propeller stationary. In the embodiment of Fig. 3, to be described in greater detail, means are provided for enabling pitch change of the propeller blades while the propeller is in operation.

Referring to Fig. 1 it will be seen that a large open spacing exists between the hub 14 and the blade sockets 26, and between the spokes 24. This space provides for passage of working fluid for a propeller driving power plant, and when the propeller of the invention is used in conjunction with a NACA E type cowling. This cowling, shown in Fig. 2, includes a small spinner 30 for streamlining the central hub 14 and includes a hollow rotating double walled spinner portion 32, suitably reinforced and having diaphragms 34 and 36 which may be secured by suitable screws or the like to the blade sockets 26. The spokes 24 extend across the air passage 38 formed between the spinners 30 and 32 and these spokes are preferably streamlined by pitched and twisted fairings 40 embracing the spokes and secured at their inner and outer ends to the spinner portions 30 and 32.

As compared with prior designs for E type cowlings, the arrangement of this invention enables a large opening area across the propeller disc since the spokes 24 of the propeller hub are of small diameter and do not encroach unduly upon the free area within the spinner 32. In prior constructions, propeller blade sockets were disposed within the inner spinner 30 and the large diameter shanks of the propeller blades, passing across the air passage 38 and through the outer spinner 32, occupied a substantial portion of a free space within the outer spinner. Thus, with the arrangement of the present invention, not only can a large number of propeller blades be used, adapting the propeller for the absorption of high engine power needed for transonic types of aircraft, but a large free air passage for power plant working fluid is also provided, such large air flow being essential for the proper operation of turbines of high power.

To stabilize the several hub sockets with respect to each other and to strengthen the entire propeller hub assembly, bridging elements 44 may be used to secure adjacent blade sockets 26 to one another. These members 44, preferably, are integral with their respective blade sockets in order to provide maximum strength with maximum lightness.

In the construction of a propeller hub of the sort described, various modes of fabrication can be used. One way of building the hub is to fabricate as separate elements the hub 14, the several spokes 24, the several blade sockets 26 and the several bridging members 44. These may then be assembled in an accurate holding fixture, locating all of the parts precisely so that when assembled they will be symmetrically disposed and in perfect balance. Then, the several parts may be welded to one another by a welding technique which will develop the full strength required in the propeller.

Weight considerations in propeller design are of course of the utmost importance; where a propeller is to have a large number of blades, say more than five, the present hub arrangement enables a reduction in weight over a propeller hub constructed according to conventional practice, where the blade sockets are integral with and close to the central hub. The present arrangement provides a skeletonized hub assembly where the full necessary strength may be developed but wherein lightness is attained by the utilization of spokes which join the hub to the blade sockets.

Reference may now be made to Figs. 3 and 4 which show a modification of the invention to enable pitch control of the propeller blades during operation. The hub 14 in this instance contains an annular channel 50 within which is contained a hub-concentric pitch control gear 52, rotatable on a bearing 54 with respect to the hub. The gear 52 may be driven by any appropriate pitch changing mechanism contained within a pitch changing housing 56, and control of pitch change can be afforded by any suitable known system. Adjacent and substantially parallel to each spoke 24 is a drive shaft 58, journalled at its inner end in the hub 14 as at 60, and journalled at its outer end in the inner portion of the blade socket 26 as at 62. The inner end of the shaft 58 carries a bevel pinion 64 engaged with the pitch change gear 52 while the outer end of the shaft 58 carries a spur pinion 66 engaged with an internal gear 68 secured to the inboard end of the shank 70 of the propeller blade. Thus, by rotation of the pitch change gear 52 with respect to the hub 14, pitch changing motion is imparted through each shaft 58 to each propeller blade and the pitch of all blades of the propeller will be changed simultaneously.

The mounting of each blade 70 in its socket 26 may be according to conventional practice; as shown, an anti-friction bearing 72 has one race engaging the hub socket 26 and the other race engaging a flange 74 on the blade shank. Suitable means, well known in the art, are preferably incorporated to secure each blade 28 removably in its hub socket.

The several pitch changing shafts 58 are preferably disposed either directly ahead of or directly behind their adjacent hub spokes 24, or they may be offset if desired. When they are disposed directly ahead of or behind the hub spokes, ordinary bevel and spur gearing may be used in the pitch changing system whereas, if they are offset, skew gearing would be necessary. The disposition of the drive shafts 58 directly ahead of or behind the spokes 24 simplifies the design of the spoke embracing fairings 40 as indicated in Fig. 4 and enables these fairings to be pitched to an appropriate angle according to the direction of airflow through the spinner, while presenting minimum drag to said airflow. Should it be desirable to do so, the spokes 24 might be made hollow and the pitch changing shafts 58 might be concentric therewith. Alternatively, the pitch changing spokes 24 themselves might be streamlined eliminating the need for an external fairing such as 40.

The arrangement of the invention as disclosed in Fig. 3 allows of full range of pitch change from feathering position to a reverse pitch position, in accordance with the capabilities of the pitch changing mechanism and its control system. Minor structural details in the drawings and description have been minimized to simplify an explanation of the invention since it is believed clear that those skilled in the art may readily include specific design details without the exercise of further inventive effort.

Though several embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

1. A propeller assembly comprising a central hub having a pitch changing mechanism including a gear concentric with the hub and rotative relatively thereto, spokes integral with said hub and extending radially therefrom, blade-receiving sockets, one integral with the outer end of each spoke and substantially larger in diameter than said spokes, each socket having a blade rotatably mounted therein, bearing means between each socket and blade holding said blade against lateral and outward radial forces, each blade including a gear disposed within said socket, each socket having in its inboard wall an aperture, a drive shaft lying substantially parallel to and alongside of each spoke, having an inner end gear drivably engaged by said concentric gear and passing at its outer end through said aperture, and a gear at the outer end of each drive shaft engaged with the gear of the corresponding blade, within its socket.

2. A propeller assembly comprising a central hub having a pitch changing mechanism including a gear concentric with the hub and rotative relatively thereto, spokes integral with said hub and extending radially therefrom, blade-receiving sockets, one integral with the outer end of each spoke and substantially larger in diameter than said spokes, each socket having a blade rotatably mounted therein, bearing means between each socket and blade holding said blade against lateral and outward radial forces, each blade including a gear disposed within said socket, each socket having in its inboard wall an aperture, a drive shaft lying substantially parallel to and alongside of each spoke, having an inner end gear drivably engaged by said concentric gear and passing at its outer end through said aperture, and a gear at the outer end of each drive shaft engaged with the gear of the corresponding blade, within its socket, said propeller assembly further comprising a fairing over said central hub and a hollow open-ended spinner intercepting and secured to said sockets, defining an annular air channel between said spinner and fairing traversed by said radial spokes and shafts.

3. A propeller assembly comprising a central hub having a pitch changing mechanism including a gear concentric with the hub and rotative relatively thereto, spokes integral with said hub and extending radially therefrom, blade-receiving sockets, one integral with the outer end of each spoke and substantially larger in diameter than said spokes, each socket having a blade rotatably mounted therein, bearing means between each socket and blade holding said blade against lateral and outward radial forces, each blade including a gear disposed within said socket, each socket having in its inboard wall an aperture, a drive shaft lying substantially parallel to and alongside of each spoke, having an inner end gear drivably engaged by said concentric gear and passing at its outer end through said aperture, and a gear at the outer end of each drive shaft engaged with the gear of the corresponding blade, within its socket, said propeller assembly further comprising a fairing over said central hub and a hollow open-ended spinner intercepting and secured to said sockets, defining an annular air channel between said spinner and fairing traversed by said radial spokes and shafts, and pitched fairings within said channel embracing said spokes and shafts.

4. An aeronautical propeller comprising a small central hub structure having a plurality of solid spokes integral therewith and extending radially therefrom, each spoke at its outer end having a cup-shaped socket integral therewith, radial and thrust bearing means within each said socket, a blade having a shank end disposed in each said socket and engaged by said bearing means, the blade thereby being constrained against the outward action of centrifugal force and against lateral loads, an internal gear concentric with and secured to the end of each said blade, within each said socket, a pinion engaging each said gear and journalled in its respective socket, means extending alongside each said spoke drivably connected to its respective pinion and entering into said small hub, and gear means within said small hub for driving all of said extending means in unison.

5. In an aeronautical propeller comprising a small central hub, a plurality of solid slender spokes integral therewith and extending radially therefrom, each spoke at its outer end having a cup-shaped socket integral therewith, each said socket being substantially larger in diameter than the spoke, radial and thrust bearing means within each said socket, a blade having a shank end disposed in each said socket and engaged by said bearing means, the blade thereby being constrained against the outward action of centrifugal force and against lateral loads, rotatable drive shaft means extending alongside and substantially parallel to each spoke, gear means within said small hub drivably connected to the inner ends of all said shaft means for rotatably driving them in unison, each said shaft means entering one of said cup-shaped sockets, and a gear driving connection between the outer end of each shaft means and the blade shank borne in the associated socket.

6. In an aeronautical propeller comprising a small central hub, a plurality of solid slender spokes integral therewith and extending radially therefrom, each spoke at its outer end having a cup-shaped socket integral therewith, each said socket being substantially larger in diameter than the spoke, radial and thrust bearing means within each said socket, a blade having a shank end disposed in each said socket and engaged by said bearing means, the blade thereby being constrained against the outward action of centrifugal force and against lateral loads, rotatable drive shaft means extending alongside and substantially parallel to each spoke, gear means within said small hub drivably connected to the inner ends of all said shaft means for rotatably driving them in unison, and a gear driving connection between the outer end of each shaft means and the associated blade shank.

LOUIS H. ENOS.

References Cited in the file of this patent

UNITED STATES PATENTS

| Number | Name | Date |
| --- | --- | --- |
| 1,348,432 | Lyons | Aug. 3, 1920 |
| 1,887,045 | Schwarz | Nov. 8, 1932 |
| 2,410,545 | Main | Nov. 5, 1946 |
| 2,460,559 | Wildhaber | Feb. 1, 1949 |
| 2,503,822 | Howes | Apr. 11, 1950 |

FOREIGN PATENTS

| Number | Country | Date |
| --- | --- | --- |
| 28,025 | Great Britain | Dec. 2, 1910 |
| 293,587 | Great Britain | July 12, 1928 |
| 381,648 | Great Britain | Oct. 13, 1932 |
| 768,696 | France | May 28, 1934 |
| 882,069 | France | Feb. 15, 1943 |